United States Patent
Mirashrafi et al.

(10) Patent No.: US 9,614,827 B2
(45) Date of Patent: *Apr. 4, 2017

(54) SECURE USER PRESENCE DETECTION AND AUTHENTICATION

(71) Applicant: Intel Corporation, Santa Clara, CA (US)

(72) Inventors: Mojtaba Mojy Mirashrafi, Portland, OR (US); Mousumi Hazra, Beaverton, OR (US); Gyan Prakash, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 284 days.

This patent is subject to a terminal disclaimer.

(21) Appl. No.: 14/304,146

(22) Filed: Jun. 13, 2014

(65) Prior Publication Data

US 2015/0006886 A1 Jan. 1, 2015

Related U.S. Application Data (63) Continuation of application No. 13/533,449, filed on Jun. 26, 2012, now Pat. No. 8,782,398.

(51) Int. Cl.
*H04L 29/06* (2006.01)
*G06F 21/36* (2013.01)
(Continued)

(52) U.S. Cl.
CPC .............. *H04L 63/08* (2013.01); *G06F 21/31* (2013.01); *G06F 21/36* (2013.01); *G06F 21/84* (2013.01);
(Continued)

(58) Field of Classification Search
CPC ... H04L 63/08; H04L 9/3271; H04L 63/0823; G06F 21/31; G06F 21/84; G06F 21/36; G06F 2221/2133
See application file for complete search history.

(56) References Cited

U.S. PATENT DOCUMENTS 7,379,921 B1 * 5/2008 Kiliccote ............. G06Q 20/401
705/75
7,512,978 B1 3/2009 Screen et al.
(Continued)

FOREIGN PATENT DOCUMENTS

CN 1343935 A 4/2002
CN 104335214 A 2/2015
(Continued)

OTHER PUBLICATIONS

"U.S. Appl. No. 13/533,449, Notice of Allowance mailed Mar. 6, 2014", 8 pgs.
(Continued)

*Primary Examiner* — Matthew Smithers
(74) *Attorney, Agent, or Firm* — Schwegman Lundberg & Woessner, P.A.

(57) ABSTRACT

This disclosure relates generally to a system and method for authenticating an electronic device may comprise a server configured to transmit an encrypted object, the encrypted object having an image file format, to the electronic device, the encrypted object being encrypted based on a certificate, the electronic device operatively coupled to the server and comprising a processor registered with the server to create a secured communication link between the processor and the server, wherein the certificate corresponds to the processor, the processor having a cryptographic engine configured to decrypt the encrypted object to result in a decrypted graphic, and a user interface operatively coupled to the processor. The user interface may be configured to display the decrypted graphic and receive a user input responsive to the decrypted graphic. The server may authenticate the electronic device based, at least in part, on the user input.

20 Claims, 6 Drawing Sheets

(51) Int. Cl.
*H04L 9/32* (2006.01)
*G06F 21/31* (2013.01)
*G06F 21/84* (2013.01)

(52) U.S. Cl.
CPC ........ *H04L 9/3271* (2013.01); *H04L 63/0823* (2013.01); *G06F 2221/2133* (2013.01)

(56) References Cited

U.S. PATENT DOCUMENTS

| | | | |
|---|---|---|---|
| 8,024,576 B2 * | 9/2011 | Gargaro | G06Q 20/382 |
| | | | 705/64 |
| 8,112,483 B1 | 2/2012 | Emigh et al. | |
| 8,171,567 B1 * | 5/2012 | Fraser | G06T 1/0021 |
| | | | 713/176 |
| 8,782,398 B2 * | 7/2014 | Mirashrafi | H04L 63/0823 |
| | | | 713/155 |
| 2005/0060554 A1 * | 3/2005 | O'Donoghue | G06F 21/36 |
| | | | 713/183 |
| 2007/0192615 A1 | 8/2007 | Varghese et al. | |
| 2008/0046581 A1 * | 2/2008 | Molina | H04L 63/08 |
| | | | 709/229 |
| 2009/0187754 A1 * | 7/2009 | Hwang | G06F 11/1666 |
| | | | 713/2 |
| 2009/0235339 A1 * | 9/2009 | Mennes | G06F 21/33 |
| | | | 726/5 |
| 2010/0186074 A1 * | 7/2010 | Stavrou | G06F 21/36 |
| | | | 726/7 |
| 2010/0217994 A1 | 8/2010 | Ginter et al. | |
| 2010/0313013 A1 | 12/2010 | Ginter et al. | |
| 2010/0325427 A1 * | 12/2010 | Ekberg | H04L 9/321 |
| | | | 713/156 |
| 2012/0084571 A1 | 4/2012 | Weis et al. | |
| 2012/0131322 A1 | 5/2012 | Smith et al. | |
| 2012/0192252 A1 | 7/2012 | Kuo et al. | |
| 2012/0266215 A1 | 10/2012 | Frank | |
| 2012/0291108 A1 | 11/2012 | Talamo et al. | |
| 2012/0323700 A1 | 12/2012 | Aleksandrovich et al. | |
| 2013/0191641 A1 | 7/2013 | Pai | |
| 2013/0346740 A1 | 12/2013 | Mirashrafi et al. | |

FOREIGN PATENT DOCUMENTS

| | | | | |
|---|---|---|---|---|
| DE | EP 1868131 A1 | * | 12/2007 | ............. G06F 21/35 |
| EP | 2085908 A2 | | 8/2009 | |
| EP | 2222002 A2 | | 8/2010 | |
| EP | 2384040 A1 | | 11/2011 | |
| EP | 2864923 A1 | | 4/2015 | |
| GB | 2482886 A | * | 2/2012 | ............. G06F 21/36 |
| KR | 1020070118665 A | | 12/2007 | |
| WO | WO-2007087352 A2 | | 8/2007 | |
| WO | WO-2014004533 A1 | | 1/2014 | |

OTHER PUBLICATIONS

"U.S. Appl. No. 13/533,449, Notice of Allowance mailed Aug. 9, 2013", 10 pgs.

"International Application Serial No. PCT/US2013/047656, International Search Report mailed Sep. 27, 2013", 8 pgs.

"International Application Serial No. PCT/US2013/047656, Written Opinion mailed Sep. 27, 2013", 5 pgs.

"Chinese Application Serial No. 201380028698.1, Office Action mailed Jun. 29, 2016", 12 pgs.

"European Application Serial No. 13810606.7, Amendment filed Nov. 13, 2014", 6 pgs.

"European Application Serial No. 13810606.7, Extended European Search Report mailed Jan. 4, 2016", 8 pgs.

"International Application Serial No. PCT/US2013/047656, International Preliminary Report on Patentability mailed Jan. 8, 2015", 7 pgs.

* cited by examiner

SECURE USER PRESENCE DETECTION AND AUTHENTICATION

This application is a continuation of U.S. patent application Ser. No. 13/533,449, filed on Jun. 26, 2012, which is incorporated herein by reference in its entirety.

TECHNICAL FIELD

The disclosure herein relates generally to electronic device authentication.

BACKGROUND ART

Graphics have been utilized on websites to verify that a request to access information on the website is as a result of direct human interaction with the client device. So-called user presence detection may come in a variety of forms that involve presenting a graphic that may be readily discerned by a human user but not readily discerned by an automated system. Challenge-response tests such as Completely Automated Public Turing test to tell Computer and Humans Apart (CAPTCHA) are commonly utilized for user presence detection. Such challenge-response tests pose a question or other task and evaluate success or failure based on the response to the challenge.

DESCRIPTION OF THE EMBODIMENTS

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
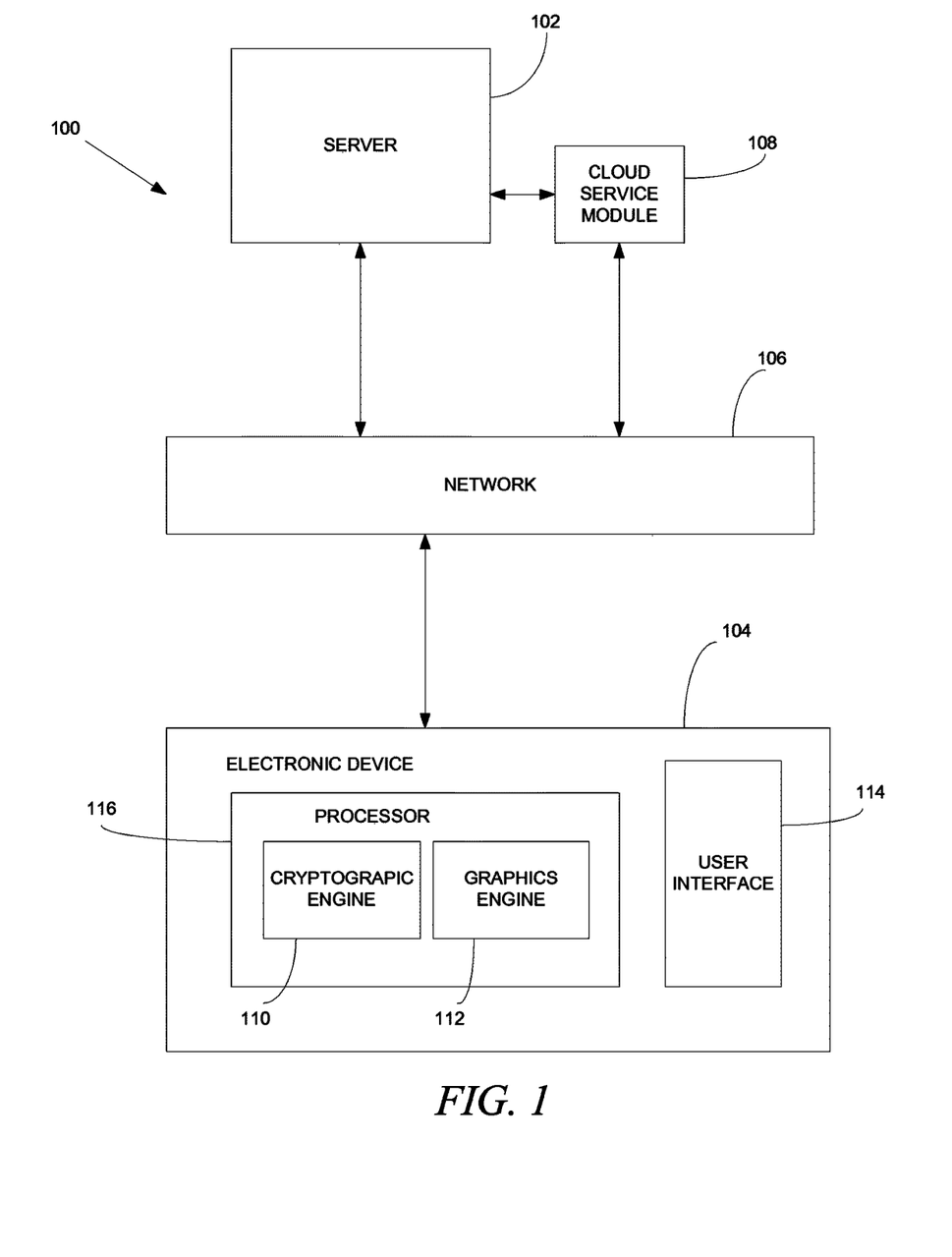
FIG. 1 is a block diagram illustrating a system including a server and an electronic device, according to an embodiment.

FIG. 1 is a block diagram illustrating a system 100 including a server 102 and an electronic device 104, according to an embodiment. The server 102 and the electronic device 104 are communicatively coupled via a network 106. In various examples, the network 106 is or includes the Internet, a wide area network, a local area network, or any of a variety of network types and networking technologies known in the art. In the illustrated example, the system 100 includes a cloud service module 108 coupled to the server 102 and the network 106 to provide or contribute general computing capabilities and services to various end-users, known as "cloud computing" in the art. In an example, the cloud service module 108 is a component of the server 102.

In various examples, the electronic device 104 is any of a variety of devices known in the art, including, but not limited to, computers of various types, smartphones, and personal digital assistants. The electronic device 104 may include a cryptographic engine 110, a graphics engine 112, and a user interface 114 coupled to the graphics engine 112. The cryptographic engine 110 may be a component of a processor 116, such as a microprocessor. The cryptographic engine 110 may operate based on dedicated cryptographic firmware in the processor 116. Alternatively, the cryptographic engine 110 may be dedicated hardware, such as a custom-designed circuit configured to provide cryptographic processing. The graphics engine 112 may be a component of the processor 116 and operate based on dedicated firmware.

In various examples, the server 102 includes a cryptographic certificate corresponding to the processor 116. The server 102 may establish a secure connection with the processor 116 via the network 106, in an example through use of the cryptographic certificate. In an example, the cryptographic certificate corresponds to the processor 116 by incorporating a cryptographic key or process that is only intentionally possessed by the cryptographic certificate and the cryptographic engine 110 to which the cryptographic certificate corresponds. In various examples, the server 102 includes multiple cryptographic certificates, each individual cryptographic certificate being individually and uniquely associated with one and only one processor 116 or cryptographic engine 110.

Figure 2:
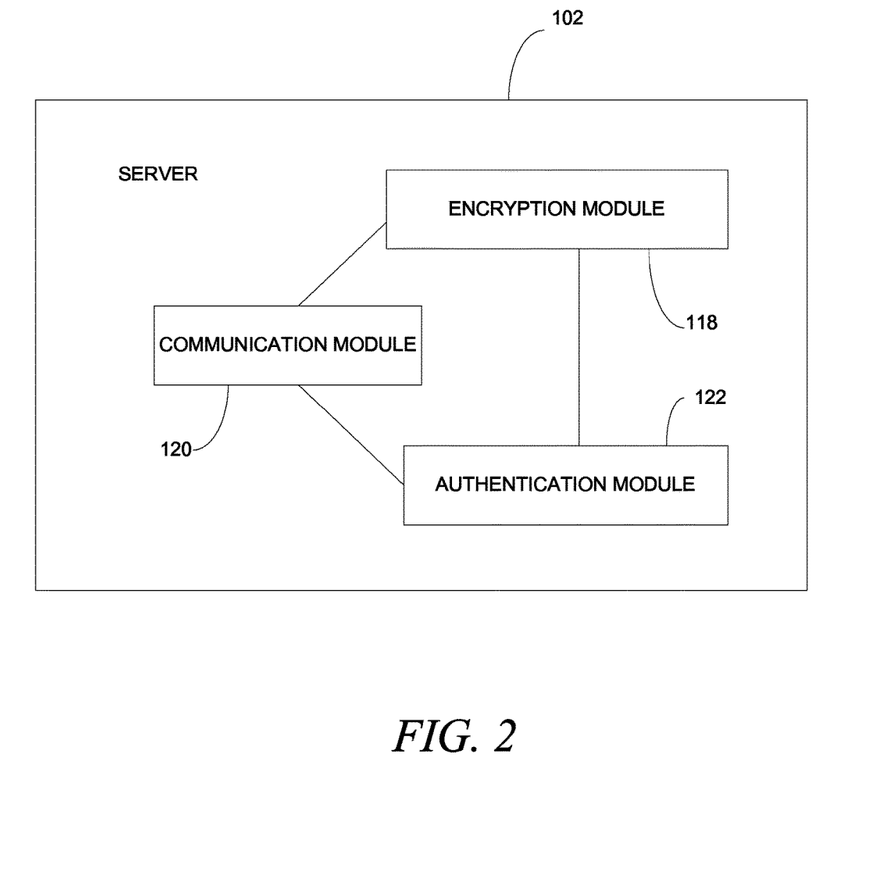
FIG. 2 is a block diagram illustrating a server, according to an embodiment.

FIG. 2 is a block diagram illustrating the server 102, according to an embodiment. The server 102 may include an encryption module 118. In an example, the encryption module 118 is not physically a component of the server 102, but rather with a device communicatively coupled to the server 102. The encryption module 118 may be a component of a processor, a controller, or dedicated circuitry. In an example, the encryption module 118 may include software implemented on a programmable processor. The encryption module 118 may include and/or utilize the cryptographic certificate corresponding to a particular cryptographic engine 110 to encrypt data destined for the electronic device 104 corresponding to the particular cryptographic engine 110.

The encryption module 118 may utilize any of a variety of cryptographic techniques known in the art. The encryption module 118 may utilize a cryptographic key that meets various standards and various levels of security which may be selectable upon implementation of the encryption module 118. In various examples, the cryptographic certificate incorporates a symmetric-key block cipher that meets the Data Encryption Standard (DES) or Advanced Encryption Standard (AES). In various examples, the encryption module 118 and the cryptographic key meet the Federal Information Processing Standard (FIPS) publication 140-2, issued 25 May 2001, updated 3 Dec. 2002. In various examples, the encryption module 118 and the cryptographic key meet Level 1 security under FIPS 140-2. In an example, the encryption module 118 meets Level 2 security under FIPS 140-2.

Such cryptographic techniques may be consistent with the function of the cryptographic certificate as detailed above. In an example, each of the encryption module 118 and the cryptographic engine 110 include a common process configured to encrypt a subject file, such as an image file as detailed below, at the encryption module 118 and decrypt the resultant encrypted object at the cryptographic engine 110. The common process may be included as part of the cryptographic certificate.

The cryptographic certificate may be associated with the cryptographic engine 110 upon manufacture of the cryptographic engine 110. In such a configuration, a key or process may be included with the cryptographic engine 110 during the manufacturing of the processor 116 or other hardware that provides the cryptographic engine 110. At manufacture of the server 102 or encryption module 118, the encryption module 118 may be loaded with the cryptographic certificate corresponding to the cryptographic engine 110.

Alternatively, the encryption module 118 may generate a key after manufacture of the cryptographic engine 110 and provision the key to the cryptographic engine 110. In such circumstances, the cryptographic engine 110 may save the key as provisioned by the encryption module 118 and the encryption module 118 may update the certificate corresponding to the cryptographic engine 110 to reflect the newly provisioned key. Conversely, a cryptographic engine 110 may provision a key or process to the encryption module 118. In such an example, the encryption module 118 may update the cryptographic certificate on the encryption module 118 based on the key or process as generated the cryptographic engine 110 and as transmitted by the electronic device 104.

The server 102 may also include a communication module 120 to communicate over the network 106. The communication module 120 may include wired and/or wireless networking capabilities, such as, but not limited to, 802.11 a/b/g/n, Wi-Fi, cellular communications, and Bluetooth. The communication module 120 may further include secure networking capabilities. The secure networking capabilities may include industry standard protocols, such as the transport layer security (TLS) protocol (according, for instance, to the RFC 5246, promulgated in August 2008), the authentication header (AH) protocol (according, for instance, to the RFC 4301 and RFC 4309 standards promulgated in December 2005), and the encapsulating security payload (ESP) protocol (according, for instance, to the RFC 4301 and RFC 4309 standards promulgated in December 2005), or proprietary security standards or protocols to generate secure communication links and secure sessions over the network 106 to the electronic device 104 and other devices.

The server may also include an authentication module 122. After receipt by the server 102 of a response by a user to a test as encrypted by the encryption module 118, the authentication module 122 may compare the response to a list of acceptable responses and, on the basis of the comparison, authenticate or not authenticate the electronic device 104 and/or a user of the electronic device 104. In an example, the list of acceptable responses includes a single response. The list of acceptable responses may be stored on the server 102, such as in the authentication module 122.

Figure 3:
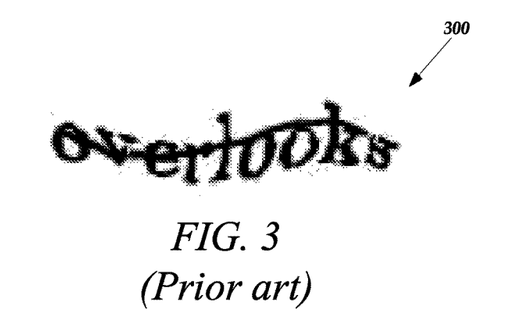
FIG. 3 is a graphic that may be encrypted by an encryption module and decrypted by a cryptographic engine, according to an embodiment.

FIG. 3 is a graphic 300 that may be encrypted by an encryption module 118 and decrypted by a cryptographic engine 110, according to an embodiment. At least prior to encryption, the graphic 300 may be in an image or graphic file format, including, but not limited to, the Graphics Interchange Format (GIF), the Joint Photographic Experts Group (JPEG), the Portable Document Format (PDF), and Scalable Vector Graphics (SVG). The graphic 300 may be encrypted by the encryption module 118 to generate an encrypted object having an image file format and decrypted by the cryptographic engine 110 to recreate the graphic 300. As discussed above, the encryption module 118 may utilize a cryptographic key, such as a symmetric-key, to encrypt the graphic 300. In an example, the graphic 300 is broken down into one hundred twenty-eight (128) bit blocks which are individually encrypted with a key of between one hundred twenty-eight (128) and two hundred fifty-six (256) bits according to the AES specification. Whatever form the graphic 300 takes, the graphic 300 is transmitted as an encrypted object that includes an encrypted image file, either of types well known in the art or as proprietary formats, which stand in contrast to conventional text formats. In an example, the encrypted object is transmitted from the server 102 to the electronic device 104 as multiple packets.

As illustrated, the graphic 300 is a CAPTCHA graphic in which induced irregularities in the graphic 300 make the graphic 300 difficult to discern by an automated system but relatively easy to discern by a person. Alternative graphics that are difficult to discern by an automated system but easy to discern by a person may also be used. Further, alternative graphics that are not necessarily difficult to discern by an automated system may also be used, such as graphics that display a picture for interpretation or pose a question, may also be used.

The system 100 may provide second factor authentication and/or user presence detection for the electronic device 104 by encrypting a graphic 300 according to the cryptographic certificate of the encryption module 118. Second factor authentication may be a security function that operates in conjunction with or in addition to another security function, in some examples a primary security function such as the secure connection provided by the communication module 120. In examples where the graphic 300 is a conventional CAPTCHA graphic that merely displays random words for the purposes of user presence detection, second factor authentication is not provided. However, when the graphic 300 prompts a user to enter a password or other security key, the graphic 300 may provide second factor authentication in addition to user presence detection.

Additionally, a graphic 300 may be presented that is relatively easily discernible to both humans and automated systems, and thus does not provide user presence detection. The ease with which a graphic 300 is discernible to humans and to automated systems may be defined in terms of a percentage accuracy of a series of attempts to interpret the graphic 300. For instance, a graphic 300 that may be interpreted successfully ninety (90) percent of the time by a class of entities, such as humans or automated systems, may be called easily discernible; conversely, a graphic 300 that is not interpreted successfully ninety (90) percent of the time by a class of entities may be defined as not easily discernible to that class of entity.

However, when a graphic 300 that does not provide user presence detection does prompt a user to enter a security key, the graphic 300 may provide second factor authentication. In such examples, the graphic 300 may be differentiated from text in that, even though the graphic is simply displaying text in graphic form, the graphic 300 may be an image file. Consequently, the graphic 300 may be decrypted by the cryptographic engine 110 using a decryption key in the same manner as a graphic that provides user presence detection.

The graphic 300 as illustrated includes a word, "overlooks," that may be read by a user. The graphic 300 may generally include text that is not necessarily limited to words with dictionary definitions. After reading the word, the user may reenter the word as a response into the user interface 114. The user interface 114 may utilize a text entry field to receive the response in a manner consistent with CAPTCHA implementations known in the art. In various examples, the electronic device 104 may transmit the response back to the server 102 for reference against the word as transmitted in the graphic 300. The electronic device 104 may transmit the response utilizing the secure connection described above. If the entered response matches the text in the graphic 300, the server 102 may deem the electronic device 104 to be authenticated. The authentication module 120 may compare the entered response against the word included in the graphic 300 or against a list of acceptable responses in the event that a prompt is displayed. Alternatively, the cryptographic engine 110 may assess the response of the user against the graphic 300 and determine authentication. The cryptographic engine 110 or electronic device 104 generally may then provide the server 102 with an indication that the user has been authenticated.

Second factor authentication and user presence detection may be provided with the graphic 300 by presenting a query or prompt that requires an answer, rather than the mere replication of a word or phrase as shown in FIG. 3. Consequently, the graphic 300 may display a prompt such as "Enter password," upon which the user enters a known but not displayed password via the user interface 114. The password may be compared against acceptable passwords in the server 102 or the cryptographic engine 110.

Complexity may be added by displaying a query in the graphic 300 instead of a prompt. A query that may be known or determinable only to particular users may be displayed and the response to the query assessed against allowable responses. In addition to or in place of a password, a user may be queried as to known, though generally private, details of the user's life or family history. The user may be queried as to any of a variety of details that may be knowable or determinable under particular circumstances, such as a known image or proximity to a geographic location or particular device, such as the electronic device 104. In such an example, the user may be prompted to enter a number displayed on or in proximity of the location or device.

In an example, the server 102 may be provisioned with the maiden name of the user's mother, and the graphic 300 may query "What is your mother's maiden name?" Such information may be provisioned to the server 102 upon authorization of the corresponding user to utilize the electronic device 104, whether at the time of manufacture of the server 102 or as a subsequent update. The authentication module 120 may then compare the entered response against the previously provisioned answer to the question and authenticate or not authenticate on that basis. In a further example, the user may be provided with a physical token that displays a number that periodically changes and is synchronized with a token in the server 102. The graphic 300 may prompt: "Enter token number" and the user response may be compared by the authentication module 120 against the synchronized token in the server 102 to authenticate or not authenticate the user. In a further example, a global positioning system (GPS) module of the electronic device 104 may determine a location of the electronic device 104, while the server 102 may query the user as to the nature of landmarks in the vicinity of the electronic device 104.

FIGS. 4A-4D are block diagrams illustrating an evolution over time of an interactive graphic 400, according to an embodiment. While the graphic 300 provides a static image, the interactive graphic 400 changes over time or as a user interacts with the interactive graphic 400 via the user interface 114. Such an interactive graphic 400 may be referred to in the art as an image interaction CAPTCHA. As illustrated, the interactive graphic 400 may sequentially illuminate or fill different boxes 402 with a color and then prompt the user to sequentially select the boxes 402 in the order in which the color was displayed. In such examples, the user may utilize the user interface 114, such as a touch screen, mouse, or other selection method known in the art, to interact with the boxes 402 in the order in which the color was displayed.

Figure 4A:
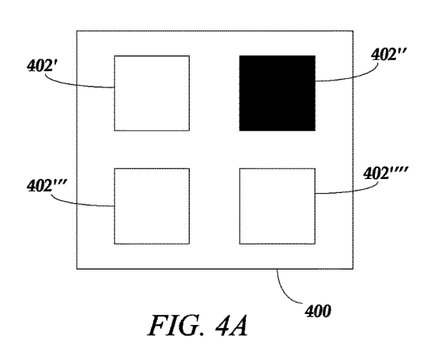
FIGS. 4A-4D are block diagrams illustrating an evolution over time of an interactive graphic, according to an embodiment.
Figure 4B:
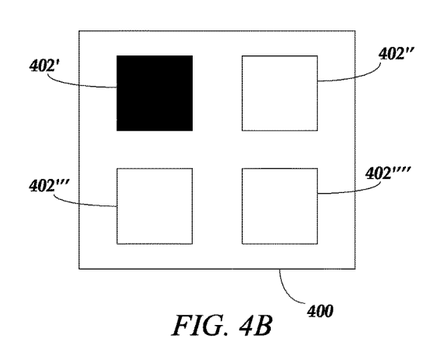
Figure 4C:
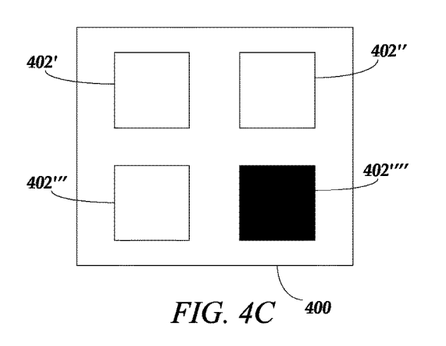
Figure 4D:
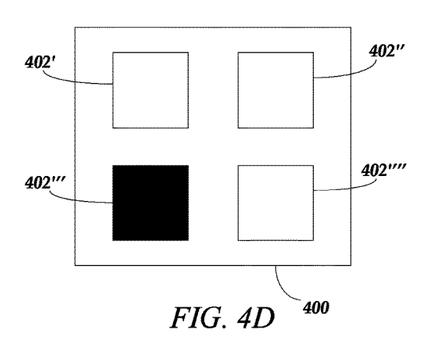

As an example, the boxes 402", 402', 402''' and 402'''' illuminated in sequence starting at FIG. 4A and ending at FIG. 4D. In an example, the user is prompted to select one illuminated box 402 before the subsequent box 402 is illuminated; in the instant example, box 402'''' is not illuminated until box 402' has been selected. Alternatively, the sequence may be displayed in its entirety first and then the user prompted to reenter the entire sequence upon the sequence having been displayed. Such an interactive graphic 402 may provide user presence detection but not second factor authentication.

Alternatively, the interactive graphic 400 may present images related to security as known in the art, such as a virtual keypad or other data entry structure. In such examples, the user may interact directly with the interactive graphic 400 to enter a password or personal identification number, such as by sequentially selecting on the interactive graphic 400 individual numerals. In another example, the user may select or trace a graphical pattern or form. Both the existence and identity of the user may thereby be authenticated to provide second factor authentication and user presence detection.

The user interface 114 of the electronic device 104 may display the interactive graphic 400 on a screen or display in a way that corresponds areas of the interactive graphic 400, such as the boxes 402, to coordinates on the screen or display. When a user interacts with the interactive graphic 400 on the display, the user interface 114 may record the coordinates of each user interaction with the interactive graphic 400. The list of acceptable responses stored on the server 102 may include coordinate ranges of user interactions that may provide authentication. The recorded coordinates from the user interface 114 may be compared by the authentication module 120 against the list of acceptable response and authentication determined if each user interaction corresponds to an acceptable coordinate range.

The graphic 300 or interactive graphic 400 is encrypted according to the cryptographic certificate for transmittal from the server 102 to the electronic device 104. As encrypted, the graphic 300 or interactive graphic 400 may be a component of an encrypted object. The encrypted object may be transmitted from the server 102 to the electronic device 104. Consequently, a third party that does not have access to the certificate that may seek to intercept or authenticate itself as the electronic device 104 may find it difficult or effectively impossible to interpret the encrypted object and view the graphic 300 or interactive graphic 400. As a result, the third party will be unable to provide a response as required by the graphic 300 or interactive graphic 400 in order to authenticate a third party device. Barring the key or process of the cryptographic certificate of the server 102 corresponding with the electronic device 104 being compromised, a third party user may find it difficult or impossible to provide a response to the server 102 that would indicate the third party device should be authenticated as if the third party device were the electronic device 104.

Figure 5:
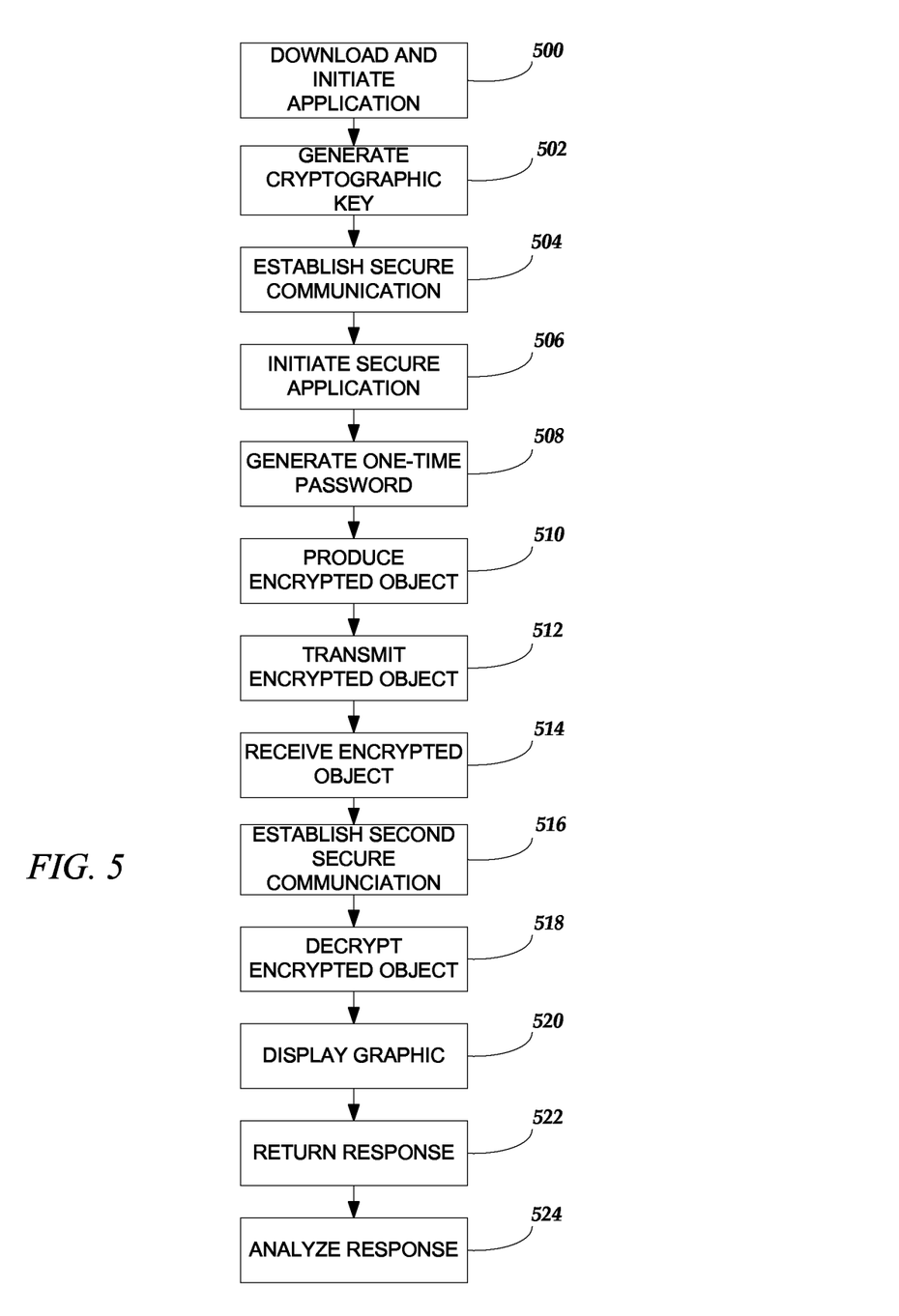
FIG. 5 is a flowchart illustrating a method for authenticating an electronic device, according to an embodiment.

FIG. 5 is a flowchart illustrating a method for authenticating an electronic device, according to an embodiment. It is noted that the flowchart of FIG. 5 may be applicable the electronic device 104 or to other devices.

At 500, a user may optionally download and initiate an application on a device, such as the electronic device 104, to interface with a cryptographic engine, such as the cryptographic engine 110. The application may obtain a graphic, such as the graphic 300 or interactive graphic 400, as decrypted by the cryptographic engine, provide a capacity for a user to enter a response to the graphic, and provide the response, such as to the cryptographic engine 110 or server 102. A device, such as the electronic device 104, may come pre-loaded with the application, rendering a separate download of the application unnecessary. The application may run as a background application when not being directly utilized. In this configuration, the application does not need to be initiated or started, fully or partially, by a user upon commencement of an authentication process.

At 502, to register a device with a server, an encryption module optionally generates a cryptographic key or a process, as well as optionally generating a website license to provide initial access to a secured website in circumstances where the subsequent provisioning of the graphic 300 is web-based. The generation of the cryptographic key and license may not be executed in the event that the cryptographic engine comes pre-programmed with the cryptographic key and license.

At 504, the server establishes a secure connection with the device and optionally transmits the cryptographic key and license to a cryptographic engine on the device where the cryptographic engine does not already possess the cryptographic key. In an example, the secure connection is established according to network security protocols described above or according to propriety network security schemes. In an example, the proprietary network security scheme may be according to the Protected Audio Video Path (PAVP) communication security feature, such as is included as part of the Intel® Insider™ system. Upon receipt of the cryptographic key and the license, the cryptographic key and the license may be encrypted by the cryptographic engine or other source on the device, such as in the cryptographic engine, and stored on the device. In an example in which the cryptographic engine already possesses the cryptographic key, the secure connection is established according to the key or process of the cryptographic certificate on the server.

At 506, the user may initiate an application on the electronic device 104 that may utilize second factor authentication or user presence detection. Such applications include, but are not limited to, banking applications, shopping applications, and websites that request personal information from a user.

At 508, the server generates a one-time password for a session. The one-time password may be based on a randomly or pseudo-randomly generated password or a timestamp and may be generated by the communication module. Alternatively, the one-time password may be based on the cryptographic certificate and be generated by the encryption module.

At 510, the server generates a frame for the one-time password. The encryption module encrypts the frame and one-time password with the cryptographic key to produce an encrypted object. The one-time password itself is the mechanism by which the electronic device 104 or user of the electronic device 104 may be authenticated. The frame is the vehicle by which the one-time password is transmitted and presented on the user interface 114 of the electronic device. In the example of FIG. 3, the CAPTCHA graphic 300 provides the frame for the one-time password, namely the word "overlooks". In such an example, the one-time password is displayed in a manner that is easily discernible to a user. Alternatively, as in the example of FIG. 4, the interactive graphic 400 does not display the one-time password, but rather the one-time password is included in the resultant encrypted object along with the interactive graphic 400 and unlocked in the event that the response to the interactive graphic 400 authenticates the user.

At 512, the server transmits the encrypted object to the electronic device 104 using the communication module and the secure connection.

At 514, the electronic device receives the encrypted object.

At 516, the electronic device may establish a second secure session with the server, after which the server may transmit a license for the second secure session to the electronic device. The second secure session may be utilized to transmit a response to the encrypted graphic back to the server 102 (e.g., at block 522, described below). The second session may lessen a likelihood that the one-time password, as decrypted and transmitted back to the server 102 for authentication, may be intercepted and compromised. In various examples, the second session is encrypted according to the same security standard as the first session, in an example according to the PAVP communication security feature. Alternatively, the second session may be encrypted according to a different standard or may utilize a different cryptographic certificate. The different standard or different cryptographic certificate may be selected or generated from the same group of standards discussed above with respect to the first session.

At 518, the cryptographic engine decrypts the encrypted object. The graphics engine may provide the graphic to the user interface. In an example, the graphics engine may have a secure channel to the user interface to reduce a likelihood of the decrypted graphic being intercepted while being transferred to the user interface. The secure channel may be generated according to a Protected Audio Video Path (PAVP) as provided by Intel® Corporation.

At 520, the user interface displays the decrypted graphic and a user provides a user response on the user interface, as disclosed above.

At 522, the device transmits the response to the one-time password to the server for authentication. In an example, the device transmits the response to the one-time password to the server according to the second secure session.

At 524, the server analyzes the one-time password as received from the device. If the response to the one-time password as received conforms to an acceptable response then the device and, in certain cases, the user of the device is deemed authenticated and secure communication may be initiated between the server and the device, such as according to the secure connections provided above. If the response does not conform to an allowable response then the device is not authenticated and secure communication is not initiated.

Figure 6:
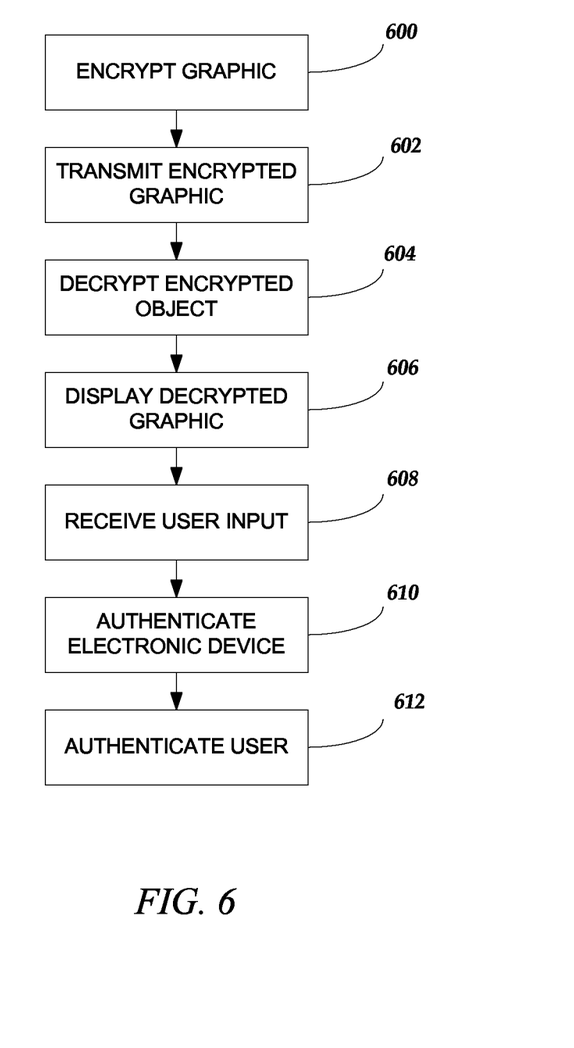
FIG. 6 is a flowchart illustrating a method for authenticating an electronic device, according to an embodiment.

FIG. 6 is a flowchart illustrating a method for authenticating an electronic device, according to an embodiment. It is noted that the flowchart of FIG. 6 may be applicable to the server 102 and the electronic device 104 as well as to other devices where appropriate.

At block 600, a graphic is encrypted with a server, with the server encrypting the graphic based on a certificate, to result in an encrypted object, the encrypted object having an image file format.

At block 602, the encrypted object is transmitted. In an example, the encrypted object is transmitted to a processor of the electronic device via a secured link, the processor being registered with the server. A processor may be registered with the server by various mechanisms. In an embodiment, the processor may be registered with the server at the time of manufacture of the processor. For example, each processor manufactured may be assigned a unique identifier. The unique identifier may be stored in a database and associated with one or more security certificates.

At block 604, the encrypted object is decrypted. In an example, the encrypted object is decrypted with a cryptographic engine of the processor to result in a decrypted graphic. In an example, the cryptographic engine utilizes the certificate, where the certificate corresponds to the processor. The certificate may utilize the cryptographic key and/or processes as discussed above.

At block 606, the decrypted graphic is displayed. In an example, the graphic is displayed on a user interface of the electronic device. The graphic may be displayed along with a data or text entry field to allow a user to enter a user input responsive to the graphic as displayed. The graphic may be transmitted to the user interface via a graphics engine. The graphics engine may be connected to the cryptographic engine via a secure connection, as detailed above.

At block 608, a user input responsive to the decrypted graphic is received. In an example, the user input is received on the user interface via the text or data entry field.

At block 610, the electronic device is authenticated. In an example, the server authenticates the electronic device based, at least in part, on the user input. The server may authenticate the electronic device by various mechanisms. In an example, the server may compare the user input responsive to the graphic against a list of acceptable responses. In examples where the graphic displays text that is to be repeated, the list of acceptable responses may include only a direct replication of the text that is to be repeated. In examples where the graphic displays a password prompt or a question to be answered, the list of acceptable responses may include multiple acceptable responses. The server may utilize an authentication engine to provide the authentication of the electronic device.

At block 612, the user is authenticated. In an example, the server authenticates and associates the user with the electronic device based, at least in part, on the user input. In certain examples, various responses in the list of acceptable responses may correspond to particular users. In such examples, the server may authenticate the particular users based on the entered response.

In a further embodiment, the cryptographic engine decrypts the encrypted object with dedicated cryptographic firmware. For example, the processor may be loaded with firmware including processes for encrypting and decrypting encrypted objects according to the key and/or process included in the certificate. The firmware may be included at the time of manufacture of the processor or updated post-manufacture.

In a further embodiment, the decrypted graphic is an interactive graphic and receiving the user input is based, at least in part, on a user interaction with the interactive graphic. For instance, the user may follow instructions on the interactive graphic to demonstrate user presence. In a further example, the user may utilize a graphic interface on the interactive graphic to enter a password or personal identification number. The user may interact with the interactive graphic rather than entering text responses into a text field.

In a further embodiment, the interactive graphic displays a sequence of images and wherein receiving the user interaction is based on a user response to the sequence of images. For instance, a user may repeat a displayed pattern on the interactive graphic. In a further example, the user may identify a series of images displayed on the interactive graphic.

In a further embodiment, the decrypted graphic is a challenge-response test. In an example, the challenge-response test demonstrates user presence by displaying a CAPTCHA graphic.

In a further embodiment, the challenge-response test comprises the decrypted graphic displaying a question on the user interface. In an example, the server authenticates the electronic device based, at least in part, on the user input being a valid answer to the question.

In a further embodiment, the decrypted graphic is transmitted to the user interface with a graphics engine of the processor. The graphics engine of the processor may be implemented according to a variety of methods. For instance, the processor may be loaded with dedicated firmware. In an alternative example, the graphics engine may be implemented on a second processor and may communicate with the cryptographic engine according to a secure connection.

In a further embodiment, the server comprises a plurality of certificates, each one of the plurality of certificates corresponding to an individual one of a plurality of processors. A secured communication link may be established between the server and each of the plurality of processors. The encrypted object may be selectively encrypted for each one of the plurality of processors based on the one of the plurality of certificates corresponding to the one of the plurality of processors.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

Figure 7:
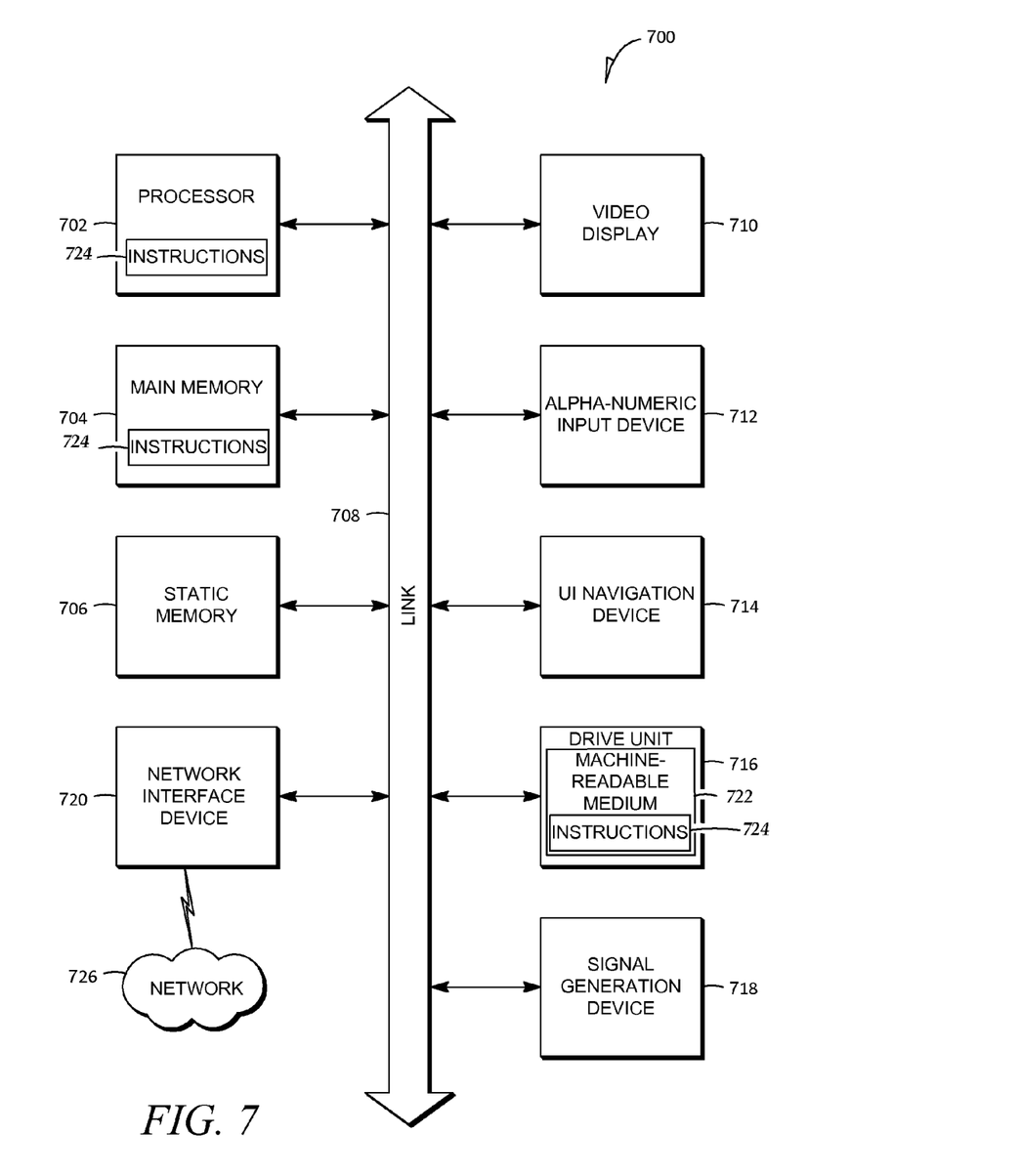
FIG. 7 is a block diagram illustrating a machine in the example form of a computer system, within which a set or sequence of instructions for causing the machine to perform any one of the methodologies discussed herein may be executed, according to an embodiment.

FIG. 7 is a block diagram illustrating a machine in the example form of a computer system 700, within which a set or sequence of instructions for causing the machine to perform any one of the methodologies discussed herein may be executed, according to an example embodiment. In alternative embodiments, the machine operates as a stand-alone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 700 includes at least one processor 702 (e.g., a central processing unit (CPU), a graphics processing unit (GPU) or both, processor cores, compute nodes, etc.), a main memory 704 and a static memory 706, which communicate with each other via a link 708 (e.g., bus or interconnect). The computer system 700 may further include a video display unit 710, an alphanumeric input device 712 (e.g., a keyboard), and a user interface (UI) navigation device 714 (e.g., a mouse). In one embodiment, the video display unit 710, input device 712 and UI navigation device 714 are incorporated into a touch screen display. The computer system 700 may additionally include a storage device 716 (e.g., a drive unit), a signal generation device 718 (e.g., a speaker), a network interface device 720, and one or more sensors (not shown), such as a global positioning system (GPS) sensor, compass, accelerometer, or other sensor(s).

The storage device 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processor 702 during execution thereof by the computer system 700, with the main memory 704, static memory 706, and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Additional Examples

In Example 1, a system for authenticating an electronic device may optionally comprise a server configured to transmit an encrypted object, the encrypted object having an image file format, to the electronic device, the encrypted object being encrypted based on a certificate, the electronic device operatively coupled to the server and comprising a processor registered with the server to create a secured communication link between the processor and the server, wherein the certificate corresponds to the processor, the processor having a cryptographic engine configured to decrypt the encrypted object to result in a decrypted graphic, and a user interface operatively coupled to the processor. The user interface may be configured to display the decrypted graphic and receive a user input responsive to the decrypted graphic. The server may authenticate the electronic device based, at least in part, on the user input.

In Example 2, a system of Example 1 is optionally configured to authenticate a user and associate the user with the electronic device based, at least in part, on the user input.

In Example 3, in the system of any one or more of Examples 1 and 2, the cryptographic engine optionally comprises dedicated cryptographic firmware configured to decrypt the encrypted object.

In Example 4, the system of any one or more of Examples 1-3 optionally includes an interactive graphic as the decrypted graphic and the user input is based, at least in part, on a user interaction with the interactive graphic.

In Example 5, the system of any one or more of Examples 1-4 optionally includes the interactive graphic configured to display a sequence of images and wherein the user interaction is based on a user response to the sequence of images.

In Example 6, the system of any one or more of Examples 1-5 optionally includes the decrypted graphic as a challenge-response test.

In Example 7, the system of any one or more of Examples 1-6 optionally includes the challenge-response test comprising a question, wherein the server authenticates the electronic device based, at least in part, on the user input being a valid answer to the question.

In Example 8, the system of any one or more of Examples 1-7 optionally includes the processor comprising a graphics engine configured to transmit the decrypted graphic to the user interface.

In Example 9, the system of any one or more of Examples 1-8 optionally includes the server comprising a plurality of certificates, each certificate corresponding to an individual one of a plurality of processors, wherein the server is configured to establish a secured communication link with each of the plurality of processors, and wherein the server is configured to selectively encrypt the encrypted object for each one of the plurality of processors based on the one of the plurality of certificates corresponding to the one of the plurality of processors.

In Example 10, a method for authenticating an electronic device may optionally comprise encrypting a graphic with a server, the server encrypting the graphic based on a certificate, to result in an encrypted object, the encrypted object having an image file format, transmitting the encrypted object to a processor of the electronic device via a secured link, the processor being registered with the server, decrypting the encrypted object with a cryptographic engine of the processor to result in a decrypted graphic, wherein the certificate corresponds to the processor, displaying the decrypted graphic on a user interface of the electronic device, receiving a user input responsive to the decrypted graphic on the user interface and authenticating the electronic device with the server based, at least in part, on the user input.

In Example 11, the method of Example 10 optionally further comprises authenticating a user with the server and associating the user with the electronic device based, at least in part, on the user input.

In Example 12, the method of any one or more of Examples 10 and 11 optionally includes the cryptographic engine configured to decrypt the encrypted object with dedicated cryptographic firmware.

In Example 13, the method of any one or more of Examples 10-12 optionally includes the decrypted graphic as an interactive graphic and receiving the user input is based, at least in part, on a user interaction with the interactive graphic.

In Example 14, the method of any one or more of Examples 10-13 optionally includes the interactive graphic which displays a sequence of images and wherein receiving the user interaction is based on a user response to the sequence of images.

In Example 15, the method of any one or more of Examples 10-14 optionally includes the decrypted graphic as a challenge-response test.

In Example 16, the method of any one or more of Examples 10-15 optionally includes the challenge-response test comprising the decrypted graphic displaying a question on the user interface and wherein the server authenticates the electronic device based, at least in part, on the user input being a valid answer to the question.

In Example 17, the method of any one or more of Examples 10-16 optionally includes transmitting the decrypted graphic to the user interface is with a graphics engine of the processor.

In Example 18, the method of any one or more of Examples 10-16 optionally includes the server comprising a plurality of certificates, each one of the plurality of certificates corresponding to an individual one of a plurality of processors, and further comprising establishing a secured communication link between the server and each of the plurality of processors, and selectively encrypting the encrypted object for each one of the plurality of processors based on the one of the plurality of certificates corresponding to the one of the plurality of processor.

In Example 19, a server for authenticating an electronic device having a processor registered to the server may optionally comprise an encryption module configured to generate an encrypted object, based on a graphic and according to a certificate corresponding to the processor of the electronic device, a communication module configured to create a secure connection to the processor and transmit the encrypted object to the processor, and an authentication module configured to authenticate the electronic device based, at least in part, on a comparison between the graphic and a user input provided on a user interface of the electronic device, wherein the user input is responsive to the graphic as.

In Example 20, the server of Example 19 may optionally include that the authentication module is configured to authenticate a user and associate the user with the electronic device based, at least in part, on the user input.

In Example 21, the server of any one or more of Examples 19 and 20 may optionally include that the graphic is an interactive graphic and the user input is based, at least in part, on a user interaction with the interactive graphic.

In Example 22, the server of any one or more of Examples 19-21 may optionally include that the interactive graphic displays a sequence of images and wherein the user interaction is based on a user response to the sequence of images.

In Example 23, the server of any one or more of Examples 19-22 may optionally include that the encrypted graphic is a challenge-response test.

In Example 24, the server of any one or more of Examples 19-23 may optionally include that the challenge-response test comprises a question and wherein the server authenticates the electronic device based, at least in part, on the user input being a valid answer to the question.

In Example 25, the server of any one of Examples 19-24 may optionally include that the server comprises a plurality of certificates, each certificate corresponding to an individual one of a plurality of processors, that the communication module is configured to establish a secured communication link with each of the plurality of processors, and that the encryption module is configured to selectively encrypt the encrypted object for each one of the plurality of processors based on the one of the plurality of certificates corresponding to the one of the plurality of processors In Example 26, an electronic device may optionally comprise a processor communicatively coupled to a server via a secure connection, the processor registered to the server and the server having a certificate corresponding to the processor, the processor configured to decrypt an encrypted object encrypted by the server according to the certificate, the decryption of the encrypted object producing a graphic and a user interface operatively coupled to the processor. The user interface may optionally be configured to display the graphic as decrypted by the processor and receive a user input responsive to the graphic. The server may authenticate the electronic device based, at least in part, on the user input in comparison with the graphic.

In Example 27, the electronic device of Example 26 may optionally include that the server is configured to authenticate a user and associate the user with the electronic device based, at least in part, on the user input.

In Example 28, the electronic device of any one or more of Examples 26 and 27 may optionally include that the processor comprises dedicated cryptographic firmware configured to decrypt the encrypted object.

In Example 29, the electronic device of any one or more of Examples 26-28 may optionally include that the graphic is an interactive graphic and the user input is based, at least in part, on a user interaction with the interactive graphic.

In Example 30, the electronic device of any one or more of Examples 26-29 may optionally include that the interactive graphic displays a sequence of images and wherein the user interaction is based on a user response to the sequence of images.

In Example 31, the electronic device of any one or more of Examples 26-30 may optionally include that the graphic is a challenge-response test.

In Example 32, the electronic device of any one or more of Examples 26-31 may optionally include that the challenge-response test comprises a question and wherein the server authenticates the electronic device based, at least in part, on the user input being a valid answer to the question.

In Example 33, the electronic device of any one or more of Examples 26-32 may optionally include that the processor comprises a graphics engine configured to transmit the graphic as decrypted by the processor to the user interface.

In Example 34, a non-transitory computer readable medium for authenticating an electronic device may optionally comprise instructions to encrypt a graphic, by a server, the server encrypting the graphic based on a certificate, to result in an encrypted object, the encrypted object having an image file format, transmit the encrypted object to a processor of the electronic device via a secured link, the processor being registered with the server, and authenticate the electronic device with the server based, at least in part, on a user input received in response to the encrypted object as decrypted by a cryptographic engine of the processor and displayed on a user interface of the electronic device, wherein the certificate corresponds to the processor.

In Example 35, the computer readable medium of Example 34 may optionally further comprise authenticating a user with the server and associating the user with the electronic device based, at least in part, on the user input.

In Example 36, the computer readable medium of any one or more of Examples 34 and 35 may optionally further include that the server comprises a plurality of certificates, each one of the plurality of certificates corresponding to an individual one of a plurality of processors, and may further cause the processor to establish a secured communication link between the server and each of the plurality of processors and selectively encrypt the encrypted object for each one of the plurality of processors based on the one of the plurality of certificates corresponding to the one of the plurality of processors.

In Example 37, a method for authenticating an electronic device may optionally comprise decrypting an encrypted object, encrypted by and transmitted from a server, with a cryptographic engine of a processor of the electronic device to result in a decrypted graphic, wherein a certificate used by the server to encrypt the encrypted object corresponds to the processor, displaying the decrypted graphic on a user interface of the electronic device, and receiving a user input responsive to the decrypted graphic on the user interface, wherein the server is configured to authenticate the electronic device based, at least in part, on the user input.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A method for authenticating an electronic device with a server, comprising:
   encrypting a graphic, by a server, the server encrypting the graphic based on a certificate, to result in an encrypted object, the encrypted object having an image file format;
   transmitting the encrypted object to a processor of the electronic device via a secured link, the processor being registered with the server; and authenticating the electronic device with the server based, at least in part, on a user input received in response to the encrypted object as decrypted by a cryptographic engine of the processor and displayed on a user interface of the electronic device, wherein the certificate corresponds to the processor.

2. The method of claim 1, further comprising authenticating a user with the server and associating the user with the electronic device based, at least in part, on the user input.

3. The method of claim 1, wherein the decrypted graphic is an interactive graphic and the user input is based, at least in part, on a user interaction with the interactive graphic.

4. The method of claim 3 wherein the interactive graphic is configured to display a sequence of images and wherein receiving the user interaction is based on a user response to the sequence of images.

5. The method of claim 1, wherein the decrypted graphic is a challenge-response test.

6. The method of claim 5, wherein the challenge-response test is configured to display a question on the user interface and wherein the server authenticates the electronic device based, at least in part, on the user input being a valid answer to the question.

7. The method of claim 1, wherein the server comprises a plurality of certificates, each one of the plurality of certificates corresponding to an individual one of a plurality of processors, and further comprising:
    establishing a secured communication link between the server and each of the plurality of processors; and
    selectively encrypting the encrypted object for each one of the plurality of processors based on the one of the plurality of certificates corresponding to the one of the plurality of processors.

8. A non-transitory computer readable medium comprising instructions for:
    decrypting an encrypted object, encrypted by and transmitted from a server, with a cryptographic engine of a processor of the electronic device to result in a decrypted graphic, wherein a certificate used by the server to encrypt the encrypted object corresponds to the processor;
    displaying the decrypted graphic on a user interface of the electronic device; and
    receiving a user input responsive to the decrypted graphic on the user interface, wherein the user input may be utilized by the server to authenticate the electronic device.

9. The computer readable medium of claim 8, wherein the user input may be utilized by the server to authenticate a user and associate the user with the electronic device.

10. The computer readable medium of claim 8, wherein the cryptographic engine decrypts the encrypted object with dedicated cryptographic firmware.

11. The computer readable medium of claim 8, wherein the decrypted graphic is an interactive graphic and receiving the user input is based, at least in part, on a user interaction with the interactive graphic.

12. The computer readable medium of claim 11 wherein the interactive graphic displays a sequence of images and wherein receiving the user interaction is based on a user response to the sequence of images.

13. The computer readable medium of claim 8, wherein the graphic is a challenge-response test.

14. The computer readable medium of claim 8, further comprising transmitting the decrypted graphic to the user interface with a graphics engine of the processor.

15. A non-transitory computer readable medium comprising instructions for:
    encrypting a graphic, by a server, the server encrypting the graphic based on a certificate, to result in an encrypted object, the encrypted object having an image file format;
    transmitting the encrypted object to a processor of the electronic device via a secured link, the processor being registered with the server; and
    authenticating the electronic device with the server based, at least in part, on a user input received in response to the encrypted object as decrypted by a cryptographic engine of the processor and displayed on a user interface of the electronic device, wherein the certificate corresponds to the processor;
    wherein the decrypted graphic is an interactive graphic and the user input is based, at least in part, on a user interaction with the interactive graphic.

16. The computer readable medium of claim 15 wherein the interactive graphic is configured to display a sequence of images and wherein receiving the user interaction is based on a user response to the sequence of images.

17. The computer readable medium of claim 15, wherein the decrypted graphic is a challenge-response test.

18. The computer readable medium of claim 17, wherein the challenge-response test is configured to display a question on the user interface and wherein the server authenticates the electronic device based, at least in part, on the user input being a valid answer to the question.

19. A method for authenticating an electronic device, comprising:
    decrypting an encrypted object, encrypted by and transmitted from a server, with a cryptographic engine of a processor of the electronic device to result in a decrypted graphic, wherein a certificate used by the server to encrypt the encrypted object corresponds to the processor;
    displaying the decrypted graphic on a user interface of the electronic device; and
    receiving a user input responsive to the decrypted graphic on the user interface, wherein the user input may be utilized by the server to authenticate the electronic device, authenticate the user, and associate the user with the electronic device.

20. The method of claim 19, wherein the graphic is a challenge-response test.

* * * * *

UNITED STATES PATENT AND TRADEMARK OFFICE
CERTIFICATE OF CORRECTION

PATENT NO. : 9,614,827 B2
APPLICATION NO. : 14/304146
DATED : April 4, 2017
INVENTOR(S) : Mirashrafi et al.

Page 1 of 1

It is certified that error appears in the above-identified patent and that said Letters Patent is hereby corrected as shown below:

In the Claims

In Column 17, Line 13, in Claim 4, after "claim 3", insert --,--

In Column 18, Line 1, in Claim 12, after "claim 11", insert --,--

In Column 18, Line 28, in Claim 16, after "claim 15", insert --,--

Signed and Sealed this
Fourteenth Day of April, 2020

Andrei Iancu
*Director of the United States Patent and Trademark Office*